(12) United States Patent
Cina et al.

(10) Patent No.: US 8,138,745 B2
(45) Date of Patent: Mar. 20, 2012

(54) POWER TRANSFORMER DISTRIBUTION NETWORK AND METHOD OF OPERATING SAME

(76) Inventors: Tony Cina, Woodbridge (CA); Tony D'Onofrio, Vaughan (CA)

( * ) Notice: Subject to any disclaimer, the term of this patent is extended or adjusted under 35 U.S.C. 154(b) by 317 days.

(21) Appl. No.: 11/903,671

(22) Filed: Sep. 24, 2007

(65) Prior Publication Data
US 2009/0079413 A1   Mar. 26, 2009

(51) Int. Cl.
*H01F 30/12* (2006.01)
*H01F 38/38* (2006.01)

(52) U.S. Cl. .......................... 323/361; 323/247

(58) Field of Classification Search .................. 323/361, 323/247, 305, 328, 341; 307/17, 19, 29, 307/37, 71, 83, 85; 361/603, 620, 623, 836
See application file for complete search history.

(56) References Cited

U.S. PATENT DOCUMENTS

| 6,014,323 A * | 1/2000 | Aiello et al. .................. 363/71 |
| 2005/0185429 A1 * | 8/2005 | Vinciarelli .................. 363/65 |

* cited by examiner

*Primary Examiner* — Harry Behm
*Assistant Examiner* — Matthew Grubb
(74) *Attorney, Agent, or Firm* — Beck & Tysver PLLC

(57) ABSTRACT

The present invention is single- and multi-phase power distribution systems comprising a plurality of transformers. Each transformer is connected to another of the transformers, in series (single phase) and in series and parallel (multi-phase). Each transformer has a switch connection movable between an on and an off position according to pre-determined rules.

18 Claims, 4 Drawing Sheets

POWER TRANSFORMER DISTRIBUTION NETWORK AND METHOD OF OPERATING SAME

FIELD OF THE INVENTION

This invention relates to power transformers and more specifically power transformers configured in an efficient network using switches.

BACKGROUND OF THE INVENTION

In modern electrical power distribution systems, a primary voltage leaves a sub-station and ends as a secondary voltage entering a customer's meter socket. A variety of methods, materials, and equipment are used among various utility companies, but the end result is similar.

Initially, a voltage (i.e. energy) leaves a sub-station in a primary circuit, usually in three phases (though it is possible to send it in a single or dual phase as well). The most common type of primary is known as a wye configuration (so named because of the visual similarity to the letter "Y".) The wye configuration includes 3 phases (represented by the three outer parts of the "Y") and a neutral (represented by the centre of the "Y".) The neutral is grounded both at the substation and at every power pole. In a typical 12470Y/7200 volt system, a pole mount transformer has a primary winding (coil) rated for 7200 volts and is connected across one phase of power and the neutral. The primary and secondary (low voltage) neutrals are bonded (connected) together to provide a path to blow a primary fuse if any fault occurs that allows the primary voltage to enter the secondary lines.

An older and less common method of primary configuration is known as delta, so named for the shape of the Greek letter (a triangle). Delta has three phases and no neutral. In a delta configuration there is only a single voltage between two phases (phase to phase), while in a wye configuration there are two voltages between two phases and between a phase and neutral (phase to neutral).

Electric distribution substations transform electrical power from a primary transmission voltage (i.e. a high voltage) to a lower (secondary) voltage used for local distribution to homes and businesses. Losses of power in a cable (or winding) are proportional to the square of the current, the length of the cable, and material resistivity, and are inversely proportional to cross-sectional area.

The main function of distribution transformers is to reduce voltage to the appropriate level required by users. The basic technology behind distribution transformers has not changed appreciably (if at all) over the past 80 years. In most cases, utility companies install and own/maintain distribution transformers. Utility companies size transformers (i.e. determine the required transformer coil size (winding)) based on predicted demand load as provided by a customer. These predictions almost always err on the side of caution and therefore overstate the required transformer capacity. Higher kilovolt amperage (kVA) capacity over actual use of power results in higher energy losses within the transformer coils.

An example is a transformer installed and fused for 100 kVA based on customer prediction. After three months of actual service, it might be noted that the load never exceeds 50 kVA. Because the transformer is set with a larger coil, the minimum energy required to keep the coil energized is higher than would be required if it were fitted with a smaller coil suitable for 50 kVa. The only way at present to make the transformer (and distribution system) more efficient is to replace the 100 kVA coil with a 50 kVA coil. This is expensive, impractical and inefficient.

Energy losses within transformers can generally be divided into two areas: a) load bearing losses (LBL)—a function of losses due to resistance from the winding material that originate in the coils within each transformer unit; and b) non-load bearing losses (NLBL)—a function of maintaining a transformer unit continually energized, caused by a magnetizing current (producing a continual energy loss).

Attempts to solve these problems of inefficiency and energy loss focus on the use of more efficient building materials, or otherwise focus on alternate sources of energy. Although a power supplier can adjust a power transformer (coil) size based on actual load, this requires replacement of an already installed distribution transformer, and is not cost efficient.

The present invention provides a cost efficient solution to matching transformer size to actual customer need, without requiring more energy efficient building materials or alternate sources of energy (though it is compatible with alternate sources of energy requiring transformation from one voltage to another). The present invention also does not require costly replacement of existing transformers if a customer's load demand unexpectedly increases or decreases.

SUMMARY OF THE INVENTION

In one preferred embodiment, the present invention provides a single phase power distribution system comprising a plurality of transformers. Each transformer has a voltage input and voltage output, and at least one transformer switch connection. Each transformer is connected to another of the transformers by said transformer switch connection, connecting the transformers in continuous series. Each transformer switch connection is movable between an on and an off position according to pre-determined rules.

In another preferred embodiment, the present invention provides a multi phase power distribution system comprising a plurality of transformers. Each transformer has a voltage input and voltage output, and each transformer is adapted to receive a designated voltage phase. There is a plurality of transformer switch connections, and each transformer is connected to another of said transformers by the transformer switch connection, connecting said transformers in parallel and forming transformer columns. Each transformer connection between columns is made according to corresponding voltage phase. Each transformer switch connection is movable between an on and an off position according to predetermined rules.

In yet another preferred embodiment, the present invention provides a method of providing power through single phase distribution transformers comprising providing a plurality of transformers, with each transformer having a voltage input and voltage output. There is at least one transformer switch connection, with each transformer being connected to another of said transformers by said transformer switch connection, connecting said transformers in continuous series. Each transformer switch connection is movable between an on and an off position. A voltage conductor is also provided. Additionally, there is at least one conductor switch connection, the first of said transformers being in constant communication with the conductor, and each subsequent transformer being connected to the conductor by said conductor switch connection. Each conductor switch connection is movable between an on and an off position. A primary voltage is applied to the first of said transformers voltage input, which outputs a secondary voltage from the first of said transformers voltage output to the voltage conductor. The transformer switch connections and corresponding conductor switch connections are moved from an off position to an on position based on increased load demand, and moved from an on position to an off position based on decreased load demand, all in accordance with predetermined rules.

In still another preferred embodiment, the present invention provides a method of providing power through multi phase distribution transformers comprising providing a plurality of transformers, with each transformer having a voltage input and voltage output. There is a plurality of transformer switch connections, with each transformer being connected to another of said transformers by said transformer switch connection, connecting said transformers in parallel and forming transformer columns. Each transformer connection between columns is made according to corresponding voltage phase, and each transformer switch connection is movable between an on and an off position. A voltage conductor is also provided. A plurality of conductor switch connections is provided, and each transformer of the first transformer column is in constant communication with the conductor, while each subsequent transformer of each subsequent transformer column is connected to the conductor by said conductor switch connections. Each conductor switch connection is movable between an on and an off position. A multi phase primary voltage is applied to the first of said transformer column transformer voltage inputs, with a secondary voltage outputted from the first of said transformer column transformer voltage outputs to the voltage conductor. The transformer switch connections and corresponding conductor switch connections are moved from an off position to an on position based on increased load demand, and moved from an on position to an off position based on decreased load demand, all in accordance with pre-determined rules.

DRAWINGS

DETAILED DESCRIPTION OF THE DRAWINGS

Figure 1:
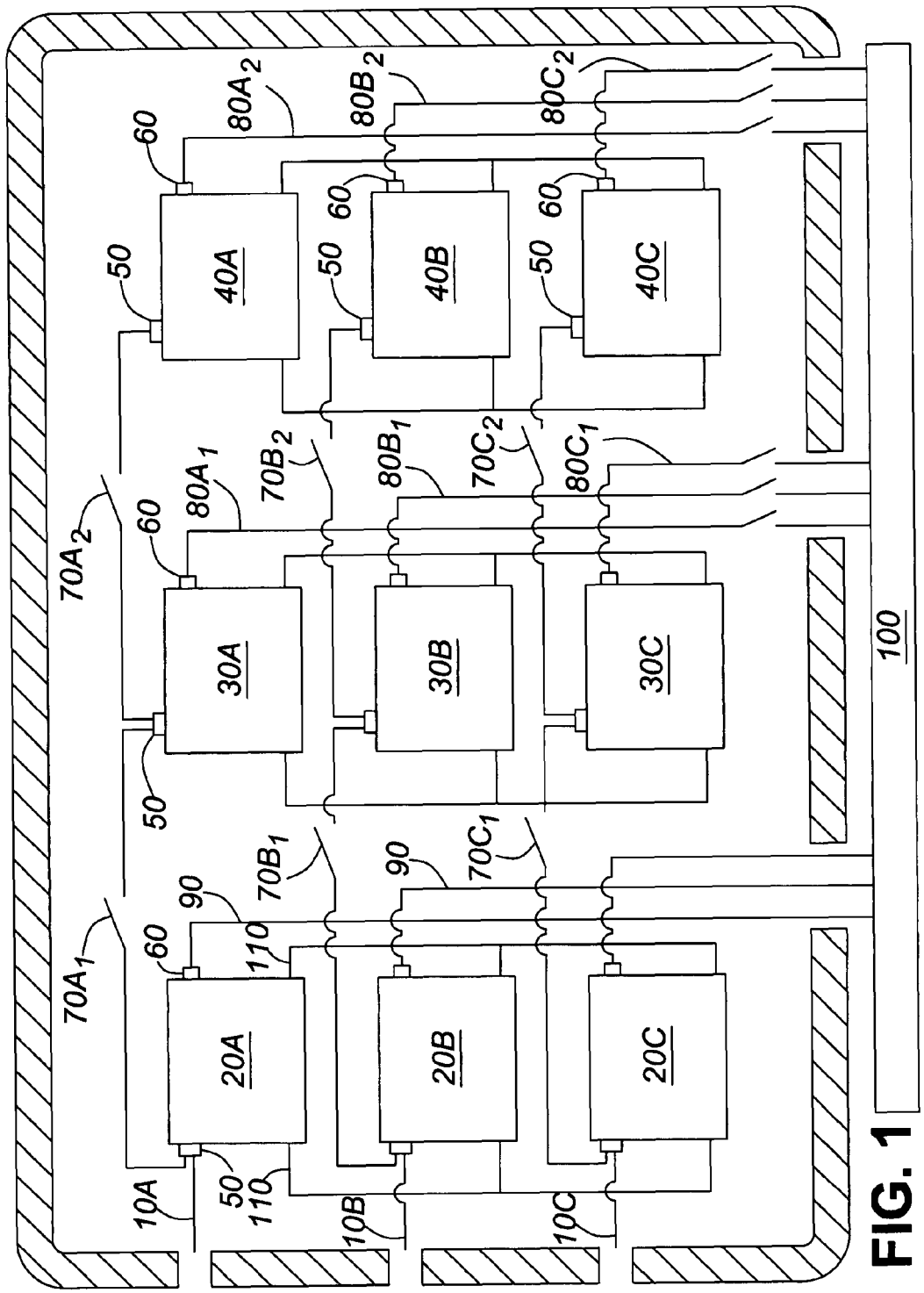
FIG. 1 is a schematic view of a multi phase power distribution network using switches.

While the present invention is susceptible of embodiments in various forms, there is shown in the drawings and will hereinafter be described some exemplary and non-limiting embodiments, with an understanding that the present disclosure is to be considered an exemplification for the invention and is not intended to limit the invention to the specific embodiments illustrated. The use of a definite or indefinite article is not intended to indicate cardinality. In particular, a reference to "the" object or "a(n)" object is intended to denote also one of a possible plurality of such objects.

In one preferred embodiment, the present invention provides a single phase (FIG. 3) power distribution system comprising a plurality of transformers (20A1, 20A2, 20A3) (only three transformers are shown in this figure for simplicity, but more transformers can be added as required). In general, a power transformer (20A1, 20A2, 20A3) is a passive device, which transforms alternating current (AC) electric energy from one circuit into another, through electromagnetic induction. It (20A1, 20A2, 20A3) normally consists of a ferromagnetic core (not shown) and two or more coils (windings—not shown). The coils are named sequentially e.g. primary winding, secondary winding. A changing current in the primary winding creates an alternating magnetic field in the core. The core multiplies this field and couples most of the flux through the secondary windings. This in turn induces alternating voltage (electromotive force or EMF) in each of the secondary windings according to Faraday's law.

Each transformer (20A1, 20A2, 20A3) has a voltage input (50) and voltage output (60). Each transformer (20A1, 20A2) is connected to another of the transformers (20A2, 20A3 respectively) by a transformer switch connection (70A1, 70A2 respectively), connecting the transformers (20A1, 20A2, 20A3) in continuous series (FIG. 3) (meaning when all switches are in their respective on position (120), transformer 20A1 will be connected to transformer 20A2 via switch 70A1, and transformer 20A2 will be connected to transformer 20A3 via switch 70A2, and so forth (if more transformers were added on)). Each transformer switch connection (70A1, 70A2) is movable between an on (120) and an off (130) position according to pre-determined rules. The transformer switch connections (70A1, 70A2) can be any type of switch suitable for use in a power distribution network, responsive to the pre-determined rules. For example, a predetermined rule can be that all transformer connection switches (70A1, 70A2) will remain in the off position (130) until a customer pays his electric bill. Another rule can be that certain transformer switch connections will move from the off (130) position to the on (120) position when a customer's demand for power increases, or conversely move from the on position (120) to the off position (130) when a customer's demand for power decreases. The transformer switch connection (70A1, 70A2) responsiveness can be automated or can be manually implemented.

When installed at a customer site, the transformer (20A1, 20A2, 20A3) network (i.e. the transformers (20A1, 20A2, 20A3) connected in series by the transformer switch connections (70A1, 70A2)) is connected by each of the transformer voltage outputs (60) to a voltage conductor (100) (for example a secondary buss bar). In a standard configuration the first transformer (20A1) is normally (but not necessarily) in constant communication by way of a permanent connection (90) with the voltage conductor (100) (that is, there is no voltage conductor switch connection (80) that connects or disconnects (as required) the transformer from or to the voltage conductor). With respect to each of the subsequent transformers (20A2, 20A3) there are a corresponding number of conductor switch connections (80A1, 80A2) connecting those transformers (20A2, 20A3) to the voltage conductor (100). Each conductor switch connection (80A1, 80A2), like the transformer switch connections (70A1, 70A2), is movable between an on (120) and an off (130) position. The voltage conductor switches (80A1, 80A2) move between the on (120) and off (130) positions in accordance with predetermined rules that correspond to the rules governing the transformer switch connections (70A1, 70A2) respectively.

In operation, a primary voltage (10) is applied to the first of the transformers (20A1) voltage input (50), which outputs a corresponding secondary voltage from the first of said transformers (20A1) voltage output (60) to the voltage conductor (100) via the permanent connection (90). It is possible to substitute the permanent connection (90) with a voltage conductor switch connection (80AN (where N is a positive integer)) (as described above), but typically there is no compelling market—based reason to do so (customers typically need instant access to a minimum of power at all times). If a voltage switch conductor (80AN) were substituted for the permanent connection (90), the reason for doing so would be a matter of personal preference. The transformer switch connections (70A1, 70A2) and corresponding conductor switch connections (80A1, 80A2) are moved from an off (130) position to an on (120) position based on increased load demand, and moved from an on (120) position to an off (130) position based on decreased load demand, all in accordance with the previously discussed pre-determined rules.

Figure 3:
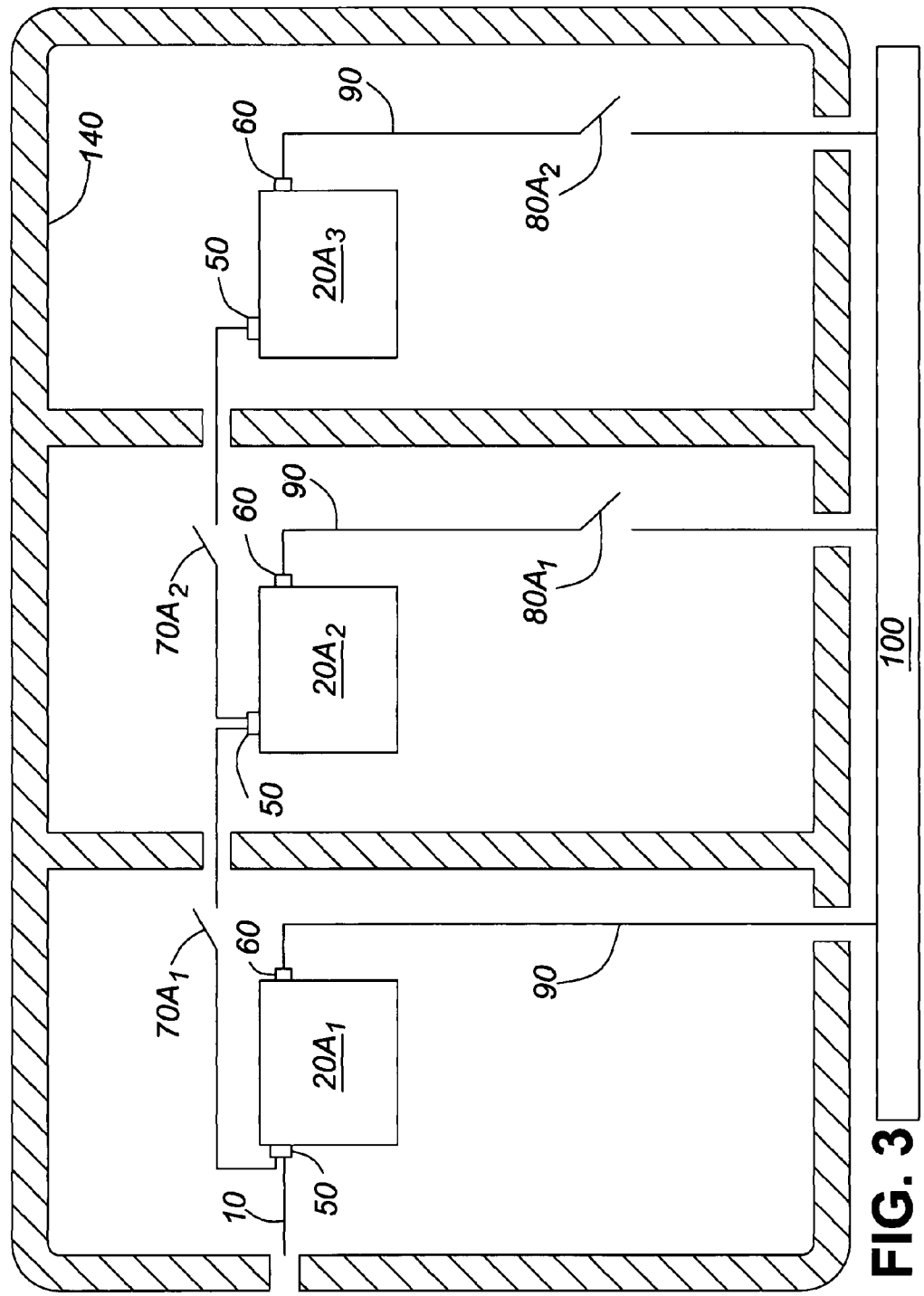
FIG. 3 is a schematic view of a single phase power distribution network using switches.
Figure 4:
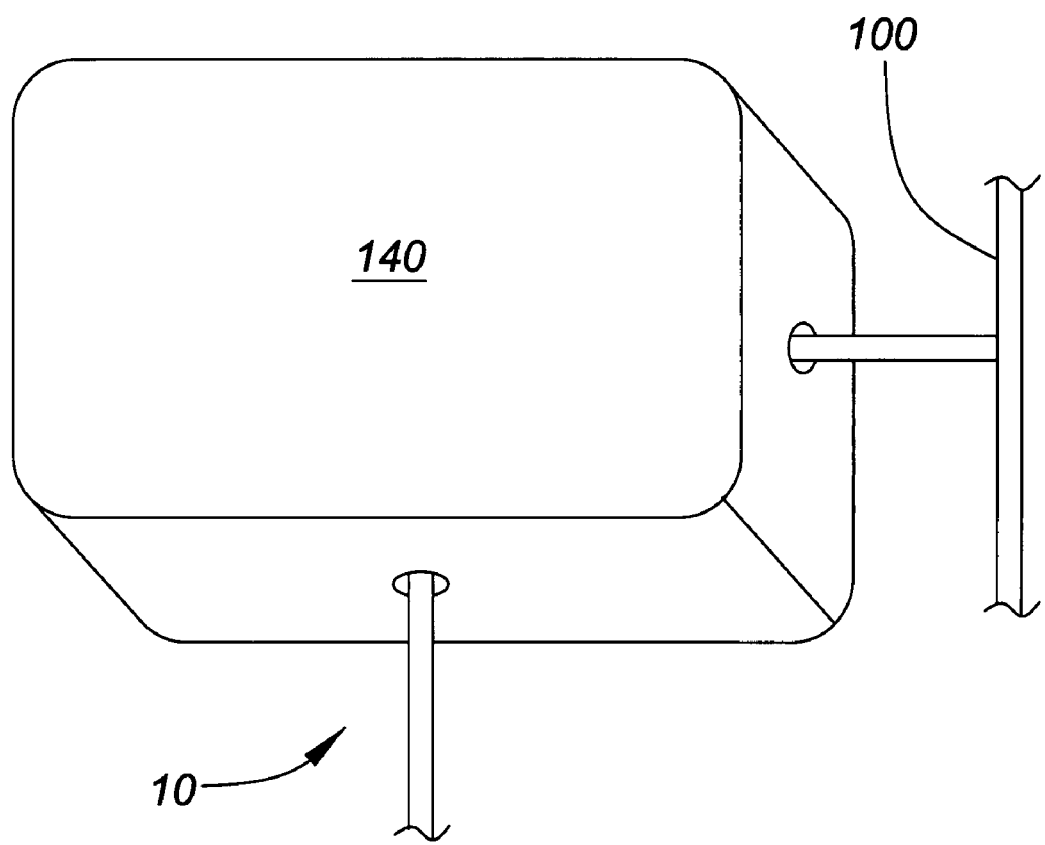
FIG. 4 is a perspective view of a casing housing a power distribution network using switches.

For example FIG. 3 shows the system wherein the first transformer (20A1) is supplying a continual stream of power to the voltage conductor (100), and because the customer's power demand has increased, the first transformer switch connection (70A1) and first voltage conductor switch connection (80A1) have moved from the off position (130) to the on position (120), thus supplying the customer with more power. The second transformer switch connection (70A2) and second voltage conductor switch connection (80A2) remain in an off position (130) because the customer's power demand has not yet reached the necessary threshold to move those switches from the off position (130) to the on position (120).

In another preferred embodiment, the present invention can be adapted to provide a multi phase power distribution (FIG. 1, FIG. 2) system comprising a plurality of transformers (20A, 20B, 20C, 30A, 30B, 30C, 40A, 40B, 40C). In the multi phase configuration, each transformer (20A, 20B, 20C, 30A, 30B, 30C, 40A, 40B, 40C) has a voltage input (50) and voltage output (60) as discussed above, and each transformer is adapted to receive a designated and corresponding voltage phase (for example the first phase (10A) enters only transformers 20A, 30A and 40A; the second phase (10B) enters only transformers 20B, 30B and 40B; the third phase (10C) enters only transformers 20C, 30C and 40C). A person of ordinary skill in the art would understand the importance of matching the phases (10A, 10B, 10C) to the proper transformers (20A, 30A, 40A; 20B, 30B, 40B; 20C, 30C, 40C) respectively, and would know how to accomplish this. They would similarly understand that extra connections (110) might be needed between transformers (20A, 20B, 20C; 30A, 30B, 30C; 40A, 40B, 40C) respectively, for example to support various configurations such as a wye-wye configuration (see FIGS. 1 and 2).

As with the single phase power distribution system, there is a plurality of transformer switch connections (70A1, 70B1, 70C1, 70A2, 70B2, 70C2), and each transformer is connected to another of said transformers by the transformer switch connection, connecting said transformers in parallel and forming transformer columns. For example, transformer 20A is connected to transformer 30A by transformer switch connection 70A1, transformer 30A is connected to transformer 40A by transformer switch connection 70A2; transformer 20B is connected to transformer 30B by transformer switch connection 70B1, transformer 30B is connected to transformer 40B by transformer switch connection 70B2; transformer 20C is connected to transformer 30C by transformer switch connection 70C1, transformer 30C is connected to transformer 40C by transformer switch connection 70C2. The connection of 20A, 30A and 40A result in a parallel growth of the network, as similarly does the connection of 20B, 30B and 40B, and 20C, 30C and 40C respectively. The transformers 20A, 20B and 20C define one transformer column; the transformers 30A, 30B and 30C define a second transformer column; and the transformers 40A, 40B and 40C define a third transformer column. Each transformer connection (70A1, 70B1, 70C1, 70A2, 70B3, 70C2) between columns is made according to corresponding voltage phase. Each transformer switch connection (70A1, 70B1, 70C1, 70A2, 70B2, 70C2) is movable between an on (120) and an off (130) position according to pre-determined rules (see the discussion above concerning pre-determined rules).

When installed at a customer site, the transformer network (i.e. the transformer column (20A, 20B, 20C) connected in parallel to transformer column (30A, 30B, 30C) by the transformer switch connections (70A1, 70B1, 70C1), and the transformer column (30A, 30B, 30C) connected in parallel to transformer column (40A, 40B, 40C) by the transformer switch connections (70A2, 70B2, 70C2)) is connected by each of the transformer voltage outputs (60) to a voltage conductor (100) (for example a secondary buss bar). In a standard configuration the first transformer column (20A, 20B, 20C) is normally (but not necessarily) in constant communication by way of a permanent connection (90) with the voltage conductor (100). With respect to each of the subsequent transformers columns (30A, 30B, 30C; 40A, 40B, 40C) there are a corresponding number of conductor switch connections (80A1, 80B1, 80C1; 80A2, 80B2, 80C2 respectively) connecting those transformers columns to the voltage conductor (100). Each conductor switch connection (80A1, 80B1, 80C1; 80A2, 80B2, 80C2), like their corresponding transformer switch connections (70A1, 70B1, 70C1, 70A2, 70B2, 70C2), is movable between an on (120) and an off (130) position. The voltage conductor switches (80A1, 80B1, 80C1; 80A2, 80B2, 80C2) move between the on (120) and off (130) positions in accordance with predetermined rules that correspond to the rules governing the transformer switch connections (70A1, 70B1, 70C1, 70A2, 70B2, 70C2) respectively.

In operation, a primary voltage (10A, 10B, 10C) is applied to the first transformer column (20A, 20B, 20C) voltage inputs (50), which output a corresponding secondary voltage from the first transformer column (20A, 20B, 20C) voltage outputs (60) to the voltage conductor (100) via the permanent connection (90). As with the single phase power distribution system, it is possible (see FIG. 2) to substitute the permanent connection (90) with a voltage conductor switch connection (80AN, 80BN, 80CN (where N is a positive integer)) (as described above), but again typically there is no compelling market—based reason to do so (customers typically need instant access to a minimum of power at all times). The transformer switch connections (70A1, 70B1, 70C1, 70A2, 70B2, 70C2) and corresponding conductor switch connections (80A1, 80B1, 80C1; 80A2, 80B2, 80C2) are moved from an off (130) position to an on (120) position based on increased load demand, and moved from an on (120) position to an off (130) position based on decreased load demand, all in accordance with the previously discussed pre-determined rules.

Figure 2:
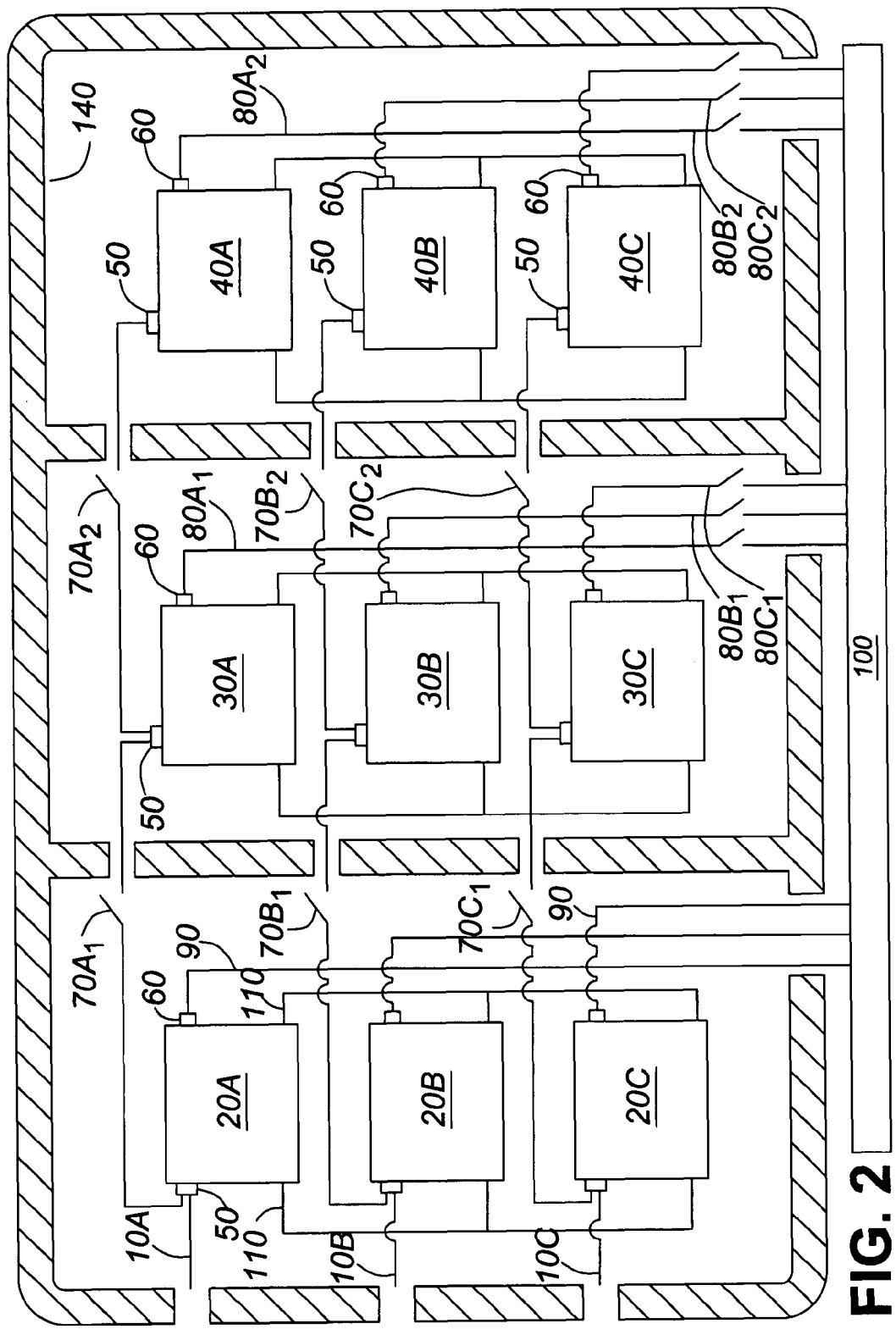
FIG. 2 is a schematic view of another multi phase power distribution network using switches.

For example FIG. 1 shows the system wherein the first transformer column (20A, 20B, 20C) is supplying a continual stream of power to the voltage conductor (100), and because the customer's power demand has increased, the first transformer column switch connections (70A1, 70B1, 70C1) and first voltage conductor switch connection (80A1, 80B1, 80C1) have moved from the off position (130) to the on position (120), thus supplying the customer with more power. The second transformer switch connection (70A2, 70B2, 70C2) and second voltage conductor switch connection (80A2, 80B2, 80C2) remain in an off position (130) because the customers power demand has not yet reached the necessary threshold to move those switches from the off position (130) to the on position (120).

In any of the previously described embodiments, it is possible (and in most cases appropriate) to house some or all of the transformers in either a single casing (140) defining a single compartment, or a single casing (140) defining multiple compartments, or multiple casings defining either single or multiple compartments, as each particular situation requires. A person of ordinary skill in the art would be able to determine what casing best suits any particular job.

Specific embodiments of power transformer distribution network and method of operating same according to the present invention have been described for the purpose of illustrating the manner in which the invention is made and used. It is understood that the implementation of other variations and modifications of the invention and its various aspects will be apparent to one skilled in the art, and that the invention is not limited by the specific embodiments described. Therefore, it is contemplated to cover the present invention including any and all modifications, variations, or equivalents that fall within the true spirit and scope of the basic underlying principles disclosed and claimed herein.

What is claimed is:

1. A multi phase AC alternating current power distribution system comprising:
   a) a plurality of transformers, each transformer having a three phase primary winding and a three phase secondary winding, each transformer having a voltage input to a primary winding and voltage output from a secondary winding, each transformer being adapted to receive a designated voltage phase;
   b) a plurality of transformer switch connections, each transformer being connected to another of said transformers by said transformer switch connection, to connect said transformers in parallel and forming transformer columns by connecting each of said secondary windings together thereby forming a common connection, and by connecting sequential transformer primary windings together through said switch connections and each transformer connection being made according to corresponding voltage phase; and
   c) each transformer switch connection being movable between an on and an off position according to pre-determined rules, that connect additional primary windings in parallel to thereby increase the capacity of said power distribution system.

2. The system in claim 1 further comprising
   d) a voltage conductor; and
   e) a plurality of conductor switch connections, each transformer secondary windings of the first transformer column being in constant communication with the conductor, each subsequent transformer of each subsequent transformer column being connected to the conductor by said conductor switch connection, each conductor switch connection being movable between an on and an off position thereby adding sequentially additional primary windings according to pre-determined rules.

3. The system in claim 1 further comprising a casing defining a plurality of compartments, each transformer being housed within each of said compartments.

4. The system in claim 1 further comprising a casing defining a plurality of compartments, each transformer column being housed within each of said compartments.

5. A method of providing power through multi phase AC alternating current distribution transformers comprising
   a) providing a plurality of transformers, each transformer having a three phase primary winding and a three phase secondary winding, each transformer having a voltage input and voltage output;
   b) providing a plurality of transformer switch connections, each transformer being connected to another of said transformers by said transformer switch connection, connecting said transformers in parallel and forming transformer columns, by connecting sequential transformer secondary windings together through said switch connections, and by connecting sequential transformer primary windings together through said switch connections, each transformer connection being made according to corresponding voltage phase, each transformer switch connection being movable between an on and an off position;
   c) providing a voltage conductor;
   d) providing a plurality of conductor switch connections, each transformer of the first transformer column being in constant communication with the conductor, each subsequent transformer of each subsequent transformer column being connected to the conductor by said conductor switch connections, each conductor switch connection being movable between an on and an off position;
   e) applying a multi phase primary voltage to the first of said transformer column transformer voltage inputs;
   f) outputting a secondary voltage from the first of said transformer column transformer voltage outputs to the voltage conductor;
   g) moving transformer switch connections and corresponding conductor switch connections from an off position to an on position based on increased load demand in accordance with pre-determined rules that connect additional primary windings in parallel to thereby increase the capacity of said power distribution system; and
   h) moving transformer switch connections and corresponding conductor switch connections from an on position to an off position based on decreased load demand in accordance with pre-determined rules that disconnect additional primary windings in parallel to thereby decrease the capacity of said power distribution system.

6. The method in claim 5 further comprising i) providing a casing defining a plurality of compartments and housing each transformer within each of said compartments.

7. The method in claim 5 further comprising i) providing a casing defining a plurality of compartments and housing each transformer column within each of said compartments.

8. A method of providing power through multi phase AC alternating current distribution transformers comprising:
   a) providing a plurality of transformers, each transformer having a three phase primary winding and a three phase secondary winding, each transformer having a voltage input and voltage output;
   b) providing a plurality of transformer switch connections, each transformer being connected to another of said transformers by said transformer switch connection, connecting said transformers in parallel and forming transformer columns, by connecting sequential transformer secondary windings together through said switch connections, and by connecting sequential transformer primary windings together through said switch connections each transformer connection being made according to corresponding voltage phase, each transformer switch connection being movable between an on and an off position;
   c) providing a voltage conductor;
   d) providing a plurality of conductor switch connections suitable in number to connect each transformer to the conductor, each transformer of each transformer column being connected to the conductor by said conductor switch connections, each conductor switch connection being movable between an on and an off position;

e) applying a multi phase primary voltage to the first of said transformer column transformer voltage inputs;

f) outputting a secondary voltage from the first of said transformer column transformer voltage outputs to the voltage conductor;

g) moving transformer switch connections and corresponding conductor switch connections from an off position to an on position based on increased load demand in accordance with pre-determined rules that connect additional primary windings in parallel to thereby increase the capacity of said power distribution system; and h) moving transformer switch connections and corresponding conductor switch connections from an on position to an off position based on decreased load demand in accordance with pre-determined rules that disconnect additional primary windings in parallel to thereby decrease the capacity of said power distribution system.

9. The method in claim 8 further comprising i) providing a casing defining a plurality of compartments and housing each transformer within each of said compartments.

10. The method in claim 8 further comprising i) providing a casing defining a plurality of compartments and housing each transformer column within each of said compartments.

11. A multi phase AC alternating current power distribution system comprising:

a) a plurality of transformers, each transformer having a plurality of phase primary windings and a corresponding plurality of phase secondary windings, each transformer having a voltage input and voltage output, each transformer being adapted to receive a designated voltage phase;

b) a plurality of transformer switch connections, each transformer being connected to another of said transformers by said transformer switch connection, to connect said transformers in parallel and forming transformer columns, by connecting sequential transformer secondary windings together through said switch connections, and by connecting sequential transformer mar windings together through said switch connections each transformer connection being made according to corresponding voltage phase; and c) each transformer switch connection being movable between an on and an off position according to pre-determined rules that connect additional primary windings in parallel to thereby determine the capacity of said power distribution system.

12. The system in claim 11 further comprising d) a voltage conductor; and e) a plurality of conductor switch connections, each transformer of the first transformer column being in constant communication with the conductor, each subsequent transformer of each subsequent transformer column being connected to the conductor by said conductor switch connection, each conductor switch connection being movable between an on and an off position according to pre-determined rules.

13. The system in claim 11 further comprising a casing defining a plurality of compartments, each transformer column being housed within each of said compartments.

14. A method of providing power through multi phase AC alternating current distribution transformers comprising:

a) providing a plurality of transformers, each transformer having a plurality of phase primary windings and a corresponding plurality of phase secondary windings, each transformer having a voltage input and voltage output;

b) providing a plurality of transformer switch connections, each transformer being connected to another of said transformers by said transformer switch connection, connecting said transformers in parallel and forming transformer columns, by connecting sequential transformer primary windings together through said switch connections, each transformer connection being made according to corresponding voltage phase, each transformer switch connection being movable between an on and an off position;

c) providing a voltage conductor;

d) providing a plurality of conductor switch connections, each transformer of the first transformer column being in constant communication with the conductor, each subsequent transformer of each subsequent transformer column, by connecting sequential transformer secondary windings together through said switch connections, and by connecting sequential transformer primary windings together through said switch connections being connected to the conductor by said conductor switch connections, each conductor switch connection being movable between an on and an off position;

e) applying a multi phase primary voltage to the first of said transformer column transformer voltage inputs;

f) outputting a secondary voltage from the first of said transformer column transformer voltage outputs to the voltage conductor;

g) moving transformer switch connections and corresponding conductor switch connections from an off position to an on position based on increased load demand in accordance with pre-determined rules to increase capacity by connecting primary windings in parallel, and h) moving transformer switch connections and corresponding conductor switch connections from an on position to an off position based on decreased load demand in accordance with pre-determined rules that disconnect additional primary windings in parallel to thereby decrease the capacity of said power distribution system.

15. The method in claim 14 further comprising i) providing a casing defining a plurality of compartments and housing each transformer within each of said compartments.

16. The method in claim 14 further comprising i) providing a casing defining a plurality of compartments and housing each transformer column within each of said compartments.

17. A method of providing power through multi phase AC alternating current distribution transformers comprising a) providing a plurality of transformers, plurality of phase primary windings and a corresponding plurality of phase secondary windings, each transformer having a voltage input and voltage output;

b) providing a plurality of transformer switch connections, each transformer being connected to another of said transformers by said transformer switch connection, connecting said transformers in parallel and forming transformer columns, by connecting sequential transformer secondary windings together through said switch connections, and by connecting sequential transformer primary windings together through said switch connections each transformer connection being made according to corresponding voltage phase, each transformer switch connection being movable between an on and an off position;

c) providing a voltage conductor;

d) providing a plurality of conductor switch connections suitable in number to connect each transformer to the conductor, each transformer of each transformer column being connected to the conductor by said conductor switch connections, each conductor switch connection being movable between an on and an off position;

e) applying a multi phase primary voltage to the first of said transformer column transformer voltage inputs;

f) outputting a secondary voltage from the first of said transformer column transformer voltage outputs to the voltage conductor;

g) moving transformer switch connections and corresponding conductor switch connections from an off position to an on position based on increased load demand in accordance with pre-determined rules that connect additional primary windings in parallel to thereby increase the capacity of said power distribution system; and h) moving transformer switch connections and corresponding conductor switch connections from an on position to an off position based on decreased load demand in accordance with pre-determined rules that disconnect additional primary windings in parallel to thereby decrease the capacity of said power distribution system.

18. The method in claim 17 further comprising i) providing a casing defining a plurality of compartments and housing each transformer column within each of said compartments.

* * * * *